US012597154B2

(12) United States Patent
Huang

(10) Patent No.: US 12,597,154 B2
(45) Date of Patent: Apr. 7, 2026

(54) IMAGE ANALYSIS METHOD WITHOUT COMPUTATION OF AN INSTALLATION ANGLE AND RELATED CAMERA APPARATUS

(71) Applicant: VIVOTEK INC., New Taipei City (TW)

(72) Inventor: Chao-Tan Huang, New Taipei City (TW)

(73) Assignee: VIVOTEK INC., New Taipei City (TW)

( * ) Notice: Subject to any disclaimer, the term of this patent is extended or adjusted under 35 U.S.C. 154(b) by 338 days.

(21) Appl. No.: 18/220,284

(22) Filed: Jul. 11, 2023

(65) Prior Publication Data

US 2024/0046497 A1 Feb. 8, 2024

(30) Foreign Application Priority Data

Aug. 3, 2022 (TW) .................................. 111129154

(51) Int. Cl.
G06T 7/60 (2017.01)
G06T 7/11 (2017.01)
G06V 10/74 (2022.01)

(52) U.S. Cl.
CPC .................. G06T 7/60 (2013.01); G06T 7/11 (2017.01); G06V 10/761 (2022.01)

(58) Field of Classification Search
CPC ........... G06T 7/60; G06T 7/11; G06V 10/761; G06V 10/25; G06V 20/52
See application file for complete search history.

(56) References Cited

U.S. PATENT DOCUMENTS

| | | | | |
|---|---|---|---|---|
| 10,089,750 | B2 * | 10/2018 | Ho | G06T 7/593 |
| 10,176,564 | B1 * | 1/2019 | El Dokor | G06T 7/187 |
| 2003/0174880 | A1 | 9/2003 | Sakamoto | |
| 2014/0363073 | A1 * | 12/2014 | Shirakyan | G06T 7/12 |
| | | | | 382/154 |
| 2015/0254830 | A1 * | 9/2015 | Shimodaira | G06T 7/0006 |
| | | | | 382/141 |
| 2017/0032194 | A1 * | 2/2017 | Yu | G06V 20/46 |

(Continued)

FOREIGN PATENT DOCUMENTS

| | | | | |
|---|---|---|---|---|
| CA | 2726895 | A1 * | 12/2009 | ............. G06F 3/017 |
| CN | 104349136 | A | 2/2015 | |
| CN | 107504957 | A | 12/2017 | |

*Primary Examiner* — Mia M Thomas

(74) *Attorney, Agent, or Firm* — Winston Hsu

(57) ABSTRACT

An image analysis method is applied to a camera apparatus and used to analyze the landform inside a detection image captured by the camera apparatus via a predefined installation angle. The image analysis method includes dividing the detection image into a plurality of first regions to acquire a plurality of first height, defining some first regions with the same height and adjacent to each other as a first reference plane area to acquire a first plane formula, selecting at least one first region adjacent to and outside the first reference plane area, applying the selected first region for the first plane formula to acquire a first planar height and comparing the first planar height with an initial first height of the at least one first region, and determining landform between the first reference plane area and the selected at least one first region in accordance with a comparison result.

20 Claims, 5 Drawing Sheets

(56)        References Cited

U.S. PATENT DOCUMENTS

| 2017/0039431 A1* | 2/2017 | Yu ........................... G06T 7/277 |
| 2017/0049366 A1* | 2/2017 | Matsumoto ........... A61B 5/1115 |
| 2018/0128602 A1* | 5/2018 | Morimoto ............ G01B 11/254 |
| 2021/0209779 A1* | 7/2021 | Yeh ........................... G06T 7/62 |

* cited by examiner

I

IMAGE ANALYSIS METHOD WITHOUT COMPUTATION OF AN INSTALLATION ANGLE AND RELATED CAMERA APPARATUS

BACKGROUND OF THE INVENTION

1. Field of the Invention

The present invention relates to an image analysis method and a camera apparatus, and more particularly, to an image analysis method and a related camera apparatus without computation of an installation angle.

2. Description of the Prior Art

With the advanced technology, a surveillance camera is widely used in the office, the shopping mall or the street to detect object information within a surveillance area. The surveillance camera captures a two-dimensional image of the surveillance area, and transforms the object information inside the two-dimensional images into three-dimensional information. The conventional surveillance camera needs to acquire its own installation height and installation angle relative to the surveillance area, for accurately computing the three-dimensional information of an object inside the surveillance area. However, the installation height and installation angle of different surveillance cameras may be varied due to installation methods, or the initial installation height and the initial installation angle of the surveillance camera may be accidentally changed due to an external force after the surveillance camera is installed. The conventional surveillance camera needs to know the correct installation height and the correct installation angle to compute the correct three-dimensional information of the object, which is inconvenient in actual use. Therefore, design of an image analysis method and a related camera apparatus of acquiring the correct three-dimensional information of the object without computation and calibration of the installation angle is an important issue in the related surveillance industry.

SUMMARY OF THE INVENTION

The present invention provides an image analysis method and a related camera apparatus without computation of an installation angle for solving above drawbacks.

According to the claimed invention, an image analysis method is applied to a camera apparatus having an operation processor and an image receiver, and adapted to analyze a landform inside a detection image captured by the image receiver via a predefined installation angle. The image analysis method includes dividing the detection image into a plurality of first regions to acquire a plurality of first heights of the plurality of first regions relative to the camera apparatus, defining some of the plurality of first regions having the same height and being adjacent to each other as a first reference plane area to acquire a first plane formula of the first reference plane area, selecting at least one of the plurality of first regions adjacent to and outside the first reference plane area, and applying the first plane formula for the selected at least one first region to acquire a first planar height of the selected at least one first region, comparing the first planar height with an initial first height of the selected at least one first region, and determining a landform relation between the first reference plane area and the selected at least one first region relative to the camera apparatus in accordance with a comparison result.

According to the claimed invention, a camera apparatus includes an image receiver and an operation processor. The image receiver is adapted to capture a detection image via a predefined installation angle. The operation processor is electrically connected to the image receiver in a wire manner or in a wireless manner, and adapted to divide the detection image into a plurality of first regions for acquiring a plurality of first heights of the plurality of first regions relative to the camera apparatus, to define some of the plurality of first regions having the same height and being adjacent to each other as a first reference plane area for acquiring a first plane formula of the first reference plane area, to select at least one of the plurality of first regions adjacent to and outside the first reference plane area and apply the first plane formula for the selected at least one first region to acquire a first planar height of the selected at least one first region, to compare the first planar height with an initial first height of the selected at least one first region, and to determine a landform relation between the first reference plane area and the selected at least one first region relative to the camera apparatus in accordance with a comparison result.

The present invention can utilize the fixed installation angle to rebuild a three-dimensional relative space of the detection image, for acquiring the correct landform information and the object information inside the detection image without accurate computation and calibration of the real installation angle. The image analysis method and the camera apparatus of the present invention can divide the detection image into the large size regions (such as the first region of the second embodiment), compute the first height of each first region to decide the landform inside the detection image; if some of the first heights of the first regions have overlarge standard deviation, the first region can be further divided into the small size regions (such as the second region of the second embodiment), and the second heights of the second regions can be analyzed to decide whether the second regions can be merged into the reference plane area having the same height, and further decide whether the reference plane area can be merged with the adjacent second region to define another reference plane area having the same height, so as to accurately decide the landform inside the detection image via a rapid and effective computation.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
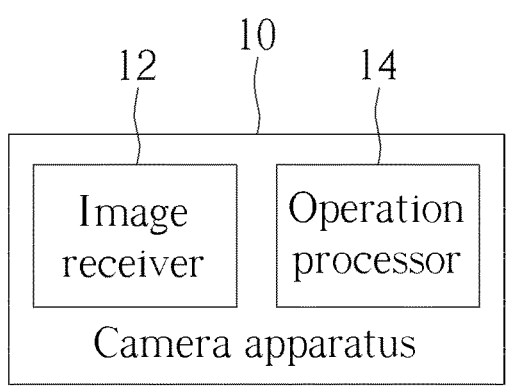
FIG. 1 is functional block diagram of a camera apparatus according to an embodiment of the present invention.
Figure 2:
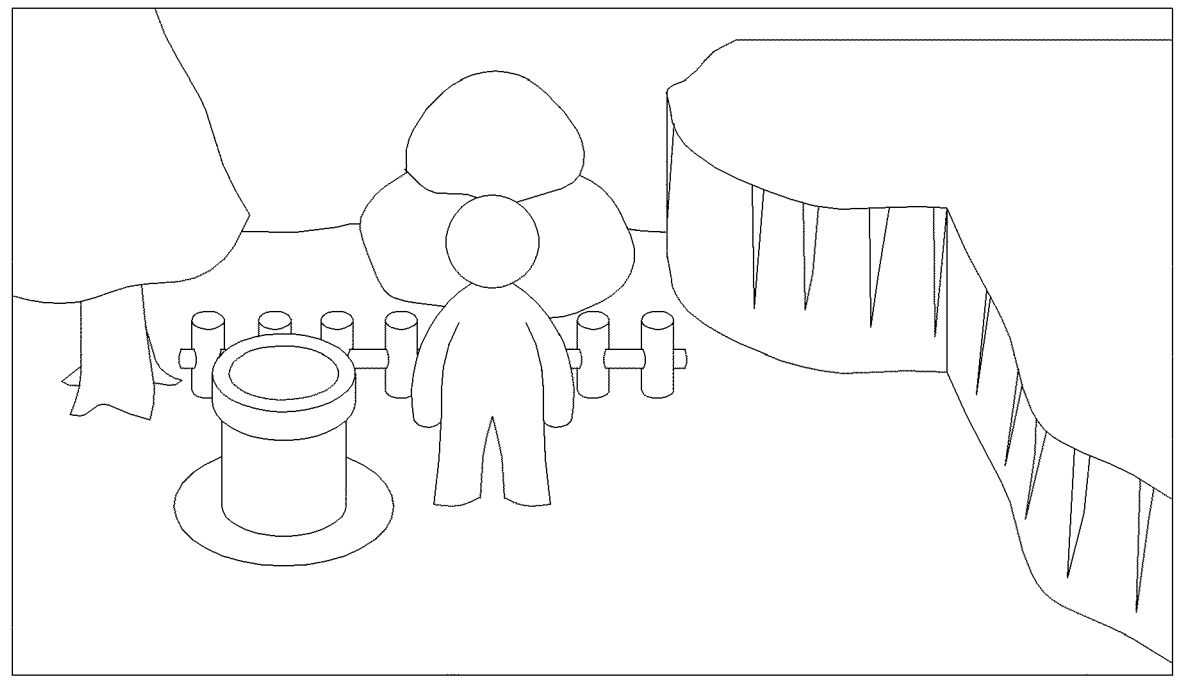
FIG. 2 is a diagram of a detection image captured by the camera apparatus according to the embodiment of the present invention.
Figure 3:
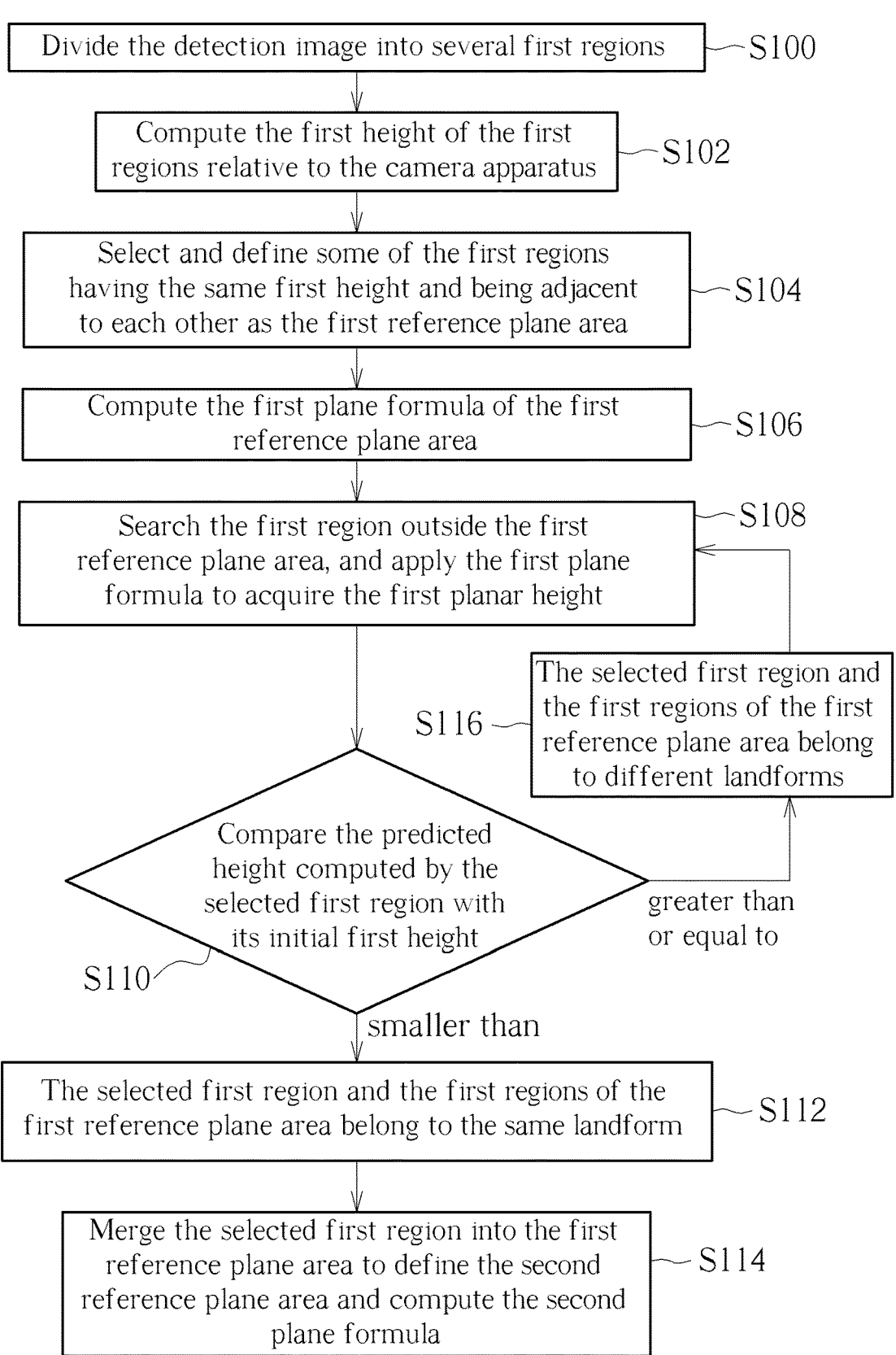
FIG. 3 is a flow chart of an image analysis method according to a first embodiment of the present invention.

Please refer to FIG. 1 to FIG. 3. FIG. 1 is functional block diagram of a camera apparatus 10 according to an embodiment of the present invention. FIG. 2 is a diagram of a detection image I captured by the camera apparatus 10 according to the embodiment of the present invention. FIG. 3 is a flow chart of an image analysis method according to a first embodiment of the present invention. The image analysis method illustrated in FIG. 3 can be suitable for the camera apparatus 10 shown in FIG. 1. The camera apparatus 10 can be a network camera used to find out a number of an object or other related information inside a surveillance region of the network camera. The camera apparatus 10 can execute the image analysis method of the present invention to decide a landform inside the surveillance region, so as to accurately compute a size of the object and a relative distance between the objects inside the surveillance region. The camera apparatus 10 can include an image receiver 12 and an operation processor 14; installation parameters of the camera apparatus 10 are known data, and the image receiver 12 can capture the detection image I via a predefined installation angle. The operation processor 14 can be electrically connected with the image receiver 12 in a wire manner or in a wireless manner, so as to acquire the detection image I and execute the image analysis method.

Figure 4:
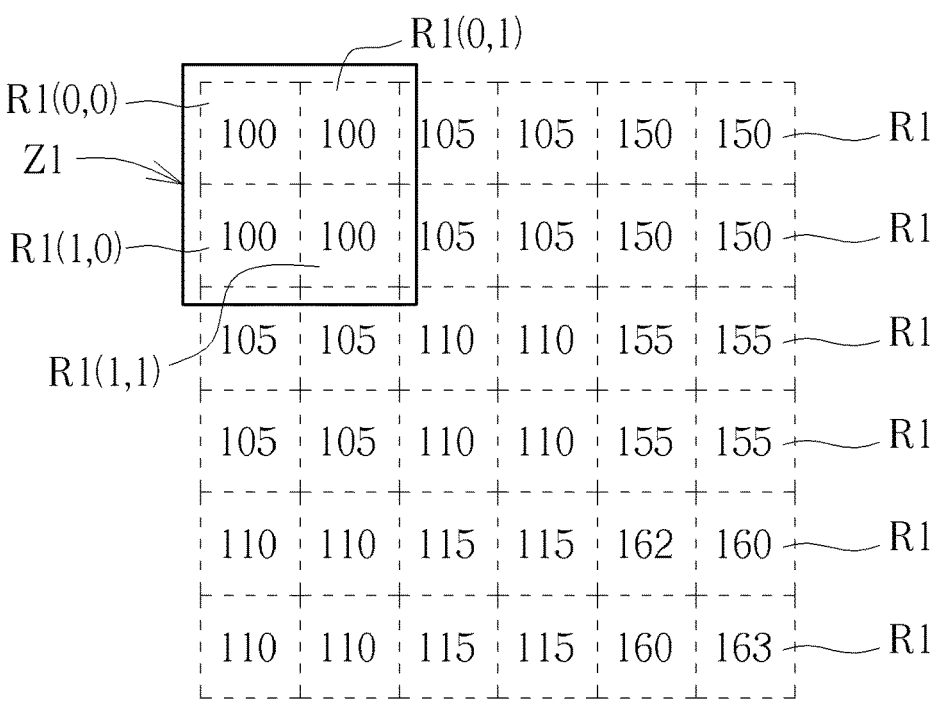
FIG. 4 and FIG. 5 are diagrams of the detection image divided into several regions in different operation modes according to the first embodiment of the present invention.
Figure 5:
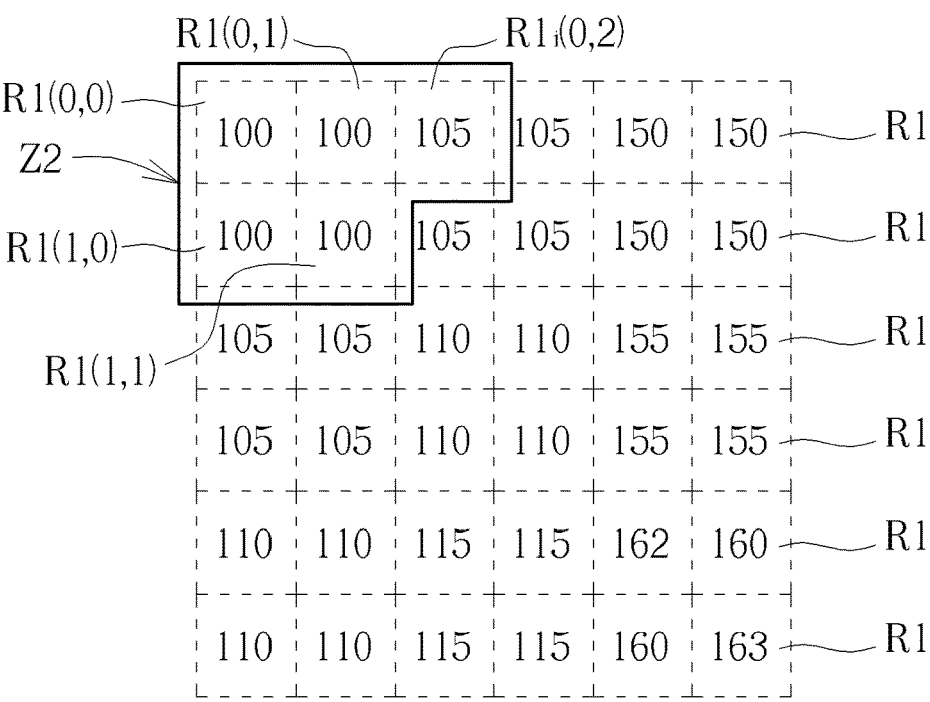

Please refer to FIG. 2 to FIG. 4 and FIG. 5. FIG. 4 and FIG. 5 are diagrams of the detection image I divided into several regions in different operation modes according to the first embodiment of the present invention. In the image analysis method, step S100 and step S102 can be executed to divide the detection image I into a plurality of first regions R1 in a predefined grid arrangement manner, and detect and compute a plurality of first heights of the plurality of first regions R1 relative to the camera apparatus 10. A number of the first region R1 divided in step S100 is not limited to the embodiment shown in FIG. 4. The first embodiment may divide the image into smaller regions with a large number; a size and a number of the divided region are not limited to the foresaid embodiment, and depend on a design demand. Step S102 can utilize the known predefined installation angle and/or a predefined installation height of the camera apparatus 10 to compute an object height of the detected object, and further utilize the computed object height and a predefined object height to compute the first height of the ground in each first region R1 relative to the camera apparatus 10 via mathematical models, such as trigonometric functions. A detailed description of the mathematical models is omitted herein for simplicity. A numeral value of each first region R1 shown in FIG. 4 can be indicated as the first height of the said region.

In step S102, the camera apparatus 10 can utilize the predefined installation angle and/or the predefined installation height to compute an average structural height of all objects inside the detection image I, such as an average height of the pedestrian, and the average height may be set as different groups in accordance with a gender, a race and an age of the pedestrian. The average height may be similar to an object mean height of a place where on the camera apparatus 10 is located. The camera apparatus 10 can compare the average height with the object mean height for calibrating the plurality of first heights; therefore, even if the predefined installation height is the unknown parameter, the camera apparatus 10 and the image analysis method of the present invention can still estimate the correct first height.

Then, step S104 and step S106 can be executed to select and define some of the plurality of first regions R1 having the same first height and being adjacent to each other as a first reference plane area Z1, and utilize a two-dimensional regression algorithm to compute a first plane formula of the first reference plane area Z1, as shown in FIG. 4. Then, step S108 can be executed to search an adjacent first region $R1_i$ around the first reference plane area Z1, and apply the first plane formula for the first region c to acquire a first planar height $h_i$. Then, step S110 can be executed to compare the first planar height $h_i$ (which means a predicted height) of the first region $R1_i$ computed by the first plane formula with an initial first height of the first region $R1_i$ (which means the first height computed in step S102). If a difference between the predicted height $h_i$ and the initial first height is smaller than a predefined threshold, step S112 and step S114 can be executed to determine the first region $R1_i$ and the first reference plane area Z1 belong to the same landform, so that the first region $R1_i$ can be merged into the first reference plane area Z1, and a combination of the first region $R1_i$ and the first reference plane area Z1 can be defined as a second reference plane area Z2; a planar regression algorithm can be applied for the second reference plane area Z2 to acquire a second plane formula. If the difference between the predicted height h, and the initial first height is greater than or equal to the predefined threshold, step S116 can be executed to determine the first region $R1_i$ and the first reference plane area Z1 belong to different landforms, and therefore the first region $R1_i$ cannot be merged into the first reference plane area Z1.

One possible embodiment of the present invention can execute step S114 to compute the second plane formula of the second reference plane area Z2 when the first region $R1_i$ is just found around the first reference plane area Z1. Another possible embodiment of the present invention can find out all the first regions $R1_i$ that conform to a condition around the first reference plane area Z1, and then execute step S114 to compute the second plane formula of the second reference plane area Z2. When the second plane formula is acquired, the foresaid steps can be executed again for computing a new plane formula; if there is no new first region $R1_i$ being merged after the new plane formula is computed, merging and searching of this plane can be ended. It should be mentioned that when the image analysis method acquires the second reference plane area Z2 and the related second plane formula in step S114 of the previous cycle, the second reference plane area Z2 and the second plane formula can be used as the first reference plane area Z1 and the related first plane formula in step S108 of the next cycle.

That is to say, the present invention can expand and transform the first reference plane area Z1 (such as the first regions R1 with the height 100 shown in FIG. 4) into the second plane formula (such as the second reference plane area Z2 contains the first regions R1 with the height 100 and the first region $R1_i$ with the height 105 shown in FIG. 5); if the present invention executes steps of the next cycle, the said plane can be further expanded to another plane that additionally contains the first regions $R1_i$ with the height 110 and the height 115 (for example, the second plane formula generated by step S114 of the previous cycle can be used as the new first plane formula in step S108 of the next cycle, so as to compute the height of the new plane and then execute following comparison); the further expanded reference plane area is not shown in the figures. The present invention can execute the foresaid steps to search other reference plane area, such as the regional plane contains the regions with the height 155 and the height 160. However, the first regions that are already merged into the first reference plane area Z1 or the second reference plane area Z2 cannot be included by the foresaid other reference plane area, and therefore the related plane formula of the foresaid other reference plane area can be accordingly computed.

Step S106 and step S114 can utilize the two-dimensional regression algorithm to compute the first plane formula and the second plane formula. As the example of the first reference plane area Z1, the first reference plane area Z1 can contain four first regions R1 on the upper left inside the detection image I. The X-Y coordinates of the four first regions R1 can be (0, 0), (0, 1), (1, 0) and (1, 1) respectively, as shown in FIG. 4; thus, formulas 1~5 can be listed as following to acquire a value of the matrix x of the first plane formula. The matrix x of the second plane formula may have to add the X-Y coordinates of the fifth first region R1 as (0, 2), and its computation is the same as the first plane formula, and a detailed description is omitted herein for simplicity.

$$a*0 + b*0 + c = 100 \qquad \text{Formula 1}$$

$$a*1 + b*0 + c = 100 \qquad \text{Formula 2}$$

$$a*0 + b*1 + c = 100 \qquad \text{Formula 3}$$

$$a*1 + b*1 + c = 100 \qquad \text{Formula 4}$$

$$x = (A^T A)^{-1} A^T B \Rightarrow A = \begin{bmatrix} 0 & 0 & 1 \\ 1 & 0 & 1 \\ 0 & 1 & 1 \\ 1 & 1 & 1 \end{bmatrix}, x = \begin{bmatrix} a \\ b \\ c \end{bmatrix}, B = \begin{bmatrix} 100 \\ 100 \\ 100 \\ 100 \end{bmatrix} \qquad \text{Formula 5}$$

Figure 6:
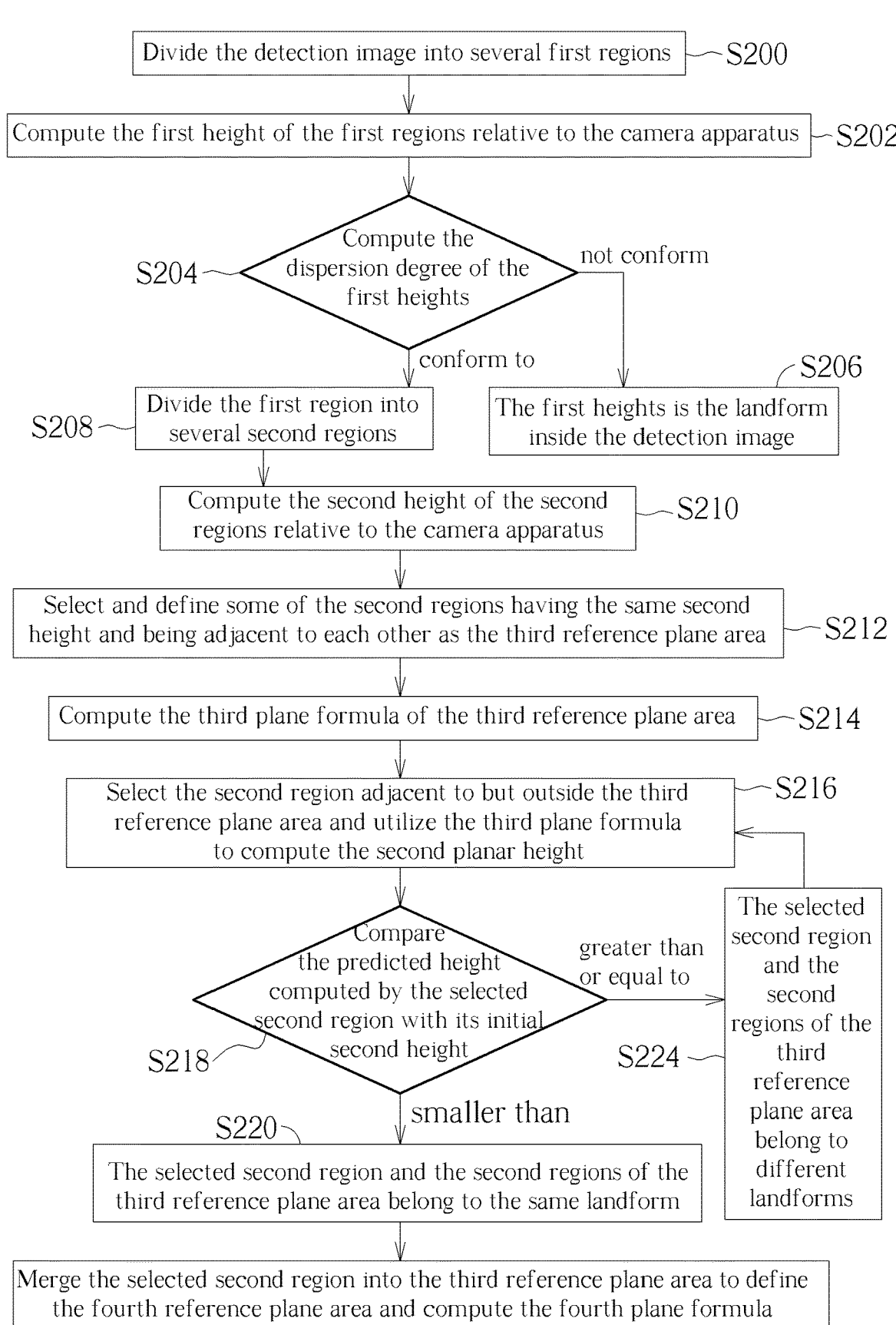
FIG. 6 is a flow chart of the image analysis method according to a second embodiment of the present invention.
Figures 7, 8:
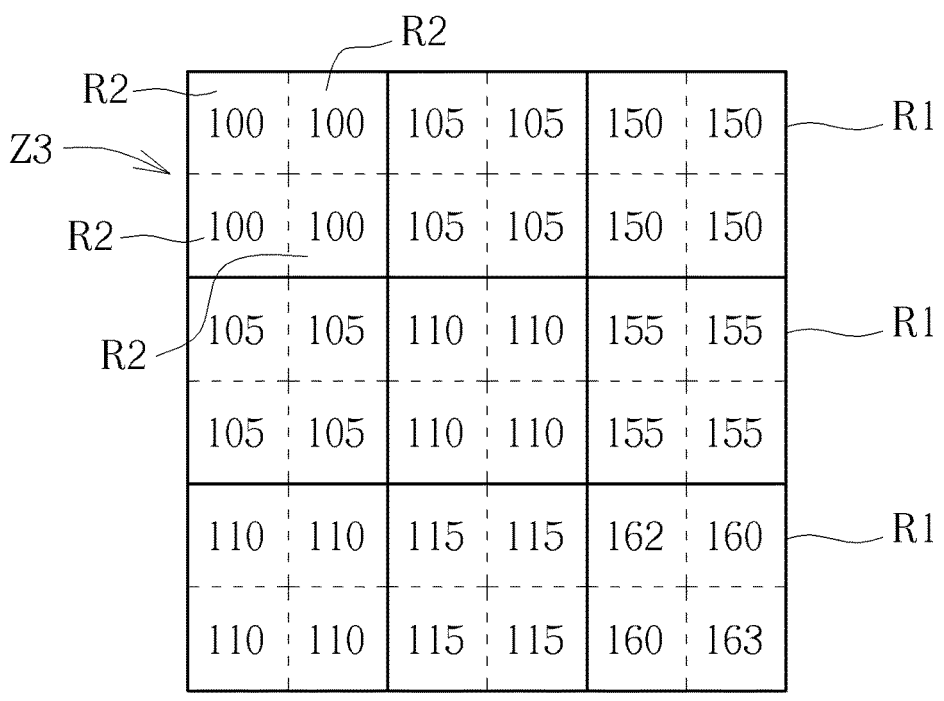
FIG. 7 and FIG. 8 are diagrams of the detection image divided into several regions in different operation modes according to the second embodiment of the present invention.

Please refer to FIG. 2 and FIG. 6 to FIG. 8. FIG. 6 is a flow chart of the image analysis method according to a second embodiment of the present invention. FIG. 7 and FIG. 8 are diagrams of the detection image I divided into several regions in different operation modes according to the second embodiment of the present invention. First, step S200 and step S202 can be executed to divide the detection image I into the plurality of first regions R1, and compute the plurality of first heights of the plurality of first regions R1 relative to the camera apparatus 10; the foresaid steps can be the same as step S100 and step S102, and the detailed description is omitted herein for simplicity. Then, step S204 can be executed to compute standard deviation of the plurality of first heights to acquire a dispersion degree. If the dispersion degree of the plurality of first heights does not conform to a predefined condition, which means a high degree of similarity, step S206 can be executed that the image analysis method can define the plurality of first heights directly as a landform height inside the detection image I, or utilize step S104, step S106, step S108, step S110, step S112, step S114 and step S116 of the first embodiment to determine a landform relation between different reference plane areas inside the detection image I.

If the dispersion degree of the plurality of first heights conforms to the predefined condition, which means a low degree of similarity, step S208 can be executed to divide each first region R1 into a plurality of second regions R2; this embodiment divides each of the first regions R1 into four second regions R2, and a number of the second regions R2 is not limited to the foresaid embodiment. Then, step S210 can be executed to utilize the predefined installation angle to respectively compute the plurality of second heights of the plurality of second regions R2 relative to the camera apparatus 10.

Moreover, step S212 and step S214 can be executed to select and define some of the plurality of second regions R2 having similar second height and being adjacent to each other as a third reference plane area Z3, and utilize the two-dimensional regression algorithm to compute a third plane formula of the third reference plane area Z3; the foresaid similar second height can be determined by another predefined threshold. Then, step S216, step S218, step S220, step S222 and step S224 can be executed to further select at least one second region R2 that is adjacent to but outside the third reference plane area Z3 from the plurality of second regions R2, and utilize the third plane formula to compute a second planar height of the selected second region R2; then, the computed second planar height (which means the predicted height) of the selected second region R2 can be compared with an initial second height of the selected second region R2. If a difference between the computed second planar height and the initial second height is greater than or equal to the predefined threshold, the selected second region R2 and the second regions R2 of the third reference plane area Z3 belong to different landforms. If the difference between the computed second planar height and the initial second height is smaller than the predefined threshold, the selected second region R2 and the second regions R2 of the third reference plane area Z3 belong to the same landform, so that the selected second region R2 can be merged into the third reference plane area Z3 for defining as a fourth reference plane area Z4, and the two-dimensional regression algorithm can be utilized to compute a fourth plane formula of the fourth reference plane area Z4.

Thus, the image analysis method of the present invention can rapidly and accurately determine the third reference plane area Z3 and the surrounding second region R2 respectively have different heights, or the third reference plane area Z3 can be further expanded to the fourth reference plane area Z4 in response to the surrounding second region R2 having the same height, so as to analyze a landform relation between the third reference plane area Z3 and the fourth reference plane area Z4 relative to the camera apparatus 10.

In conclusion, the present invention can utilize the fixed installation angle to rebuild a three-dimensional relative space of the detection image, for acquiring the correct landform information and the object information inside the detection image without accurate computation and calibration of the real installation angle. The image analysis method and the camera apparatus of the present invention can divide the detection image into the large size regions (such as the first region of the second embodiment), compute the first height of each first region to decide the landform inside the detection image; if some of the first heights of the first regions have overlarge standard deviation, the first region can be further divided into the small size regions (such as the second region of the second embodiment), and the second heights of the second regions can be analyzed to decide whether the second regions can be merged into the reference plane area having the same height, and further decide whether the reference plane area can be merged with the adjacent second region to define another reference plane area having the same height, so as to accurately decide the landform inside the detection image via a rapid and effective computation.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image analysis method applied to a camera apparatus having an operation processor and an image receiver, and adapted to analyze a landform inside a detection image captured by the image receiver via a predefined installation angle, the image analysis method comprising:

the operation processor dividing the detection image into a plurality of first regions to acquire a plurality of first heights of the plurality of first regions relative to the camera apparatus;

the operation processor defining some of the plurality of first regions having the same height and being adjacent to each other as a first reference plane area to acquire a first plane formula of the first reference plane area;

the operation processor selecting at least one of the plurality of first regions adjacent to and outside the first reference plane area, and applying the first plane formula for the selected at least one first region to acquire a first planar height of the selected at least one first region;

the operation processor comparing the first planar height with an initial first height of the selected at least one first region; and the operation processor determining a landform relation between the first reference plane area and the selected at least one first region relative to the camera apparatus in accordance with a comparison result.

2. The image analysis method of claim 1, further comprising:

the operation processor dividing each first region into a plurality of second regions when a dispersion degree of the plurality of first heights conforms to a predefined condition;

the operation processor acquiring a plurality of second heights of the plurality of second regions relative to the camera apparatus;

the operation processor defining some of the plurality of second regions having the same height and being adjacent to each other as a third reference plane area to acquire a third plane formula of the third reference plane area;

the operation processor selecting at least one of the plurality of second regions adjacent to and outside the third reference plane area, and applying the third plane formula for the selected at least one second region to acquire a second planar height of the selected at least one second region;

the operation processor comparing the second planar height with an initial second height of the selected at least one second region; and the operation processor determining a landform relation between the third reference plane area and the selected at least one second region relative to the camera apparatus in accordance with a comparison result.

3. The image analysis method of claim 2, further comprising:

the operation processor utilizing the predefined installation angle to compute the plurality of first heights of the plurality of first regions; and the operation processor computing standard deviation of the plurality of first heights to acquire the dispersion degree.

4. The image analysis method of claim 3, wherein the operation processor utilizes the predefined installation angle to compute an average height of all objects inside the detection image, and compares the average height with an object mean height of a place where on the camera apparatus is located so as to calibrate the plurality of first heights.

5. The image analysis method of claim 2, further comprising:

the operation processor setting the plurality of first heights as a landform height inside the detection image when the dispersion degree of the plurality of first heights does not conform to the predefined condition.

6. The image analysis method of claim 1, further comprising:

the operation processor utilizing a two-dimensional regression algorithm to acquire the first plane formula.

7. The image analysis method of claim 1, further comprising:

the operation processor determining the at least one first region adjacent to and outside the first reference plane area is on the same plane as the first reference plane area when a difference between the first planar height of the selected at least one first region and the initial first height is lower than a predefined threshold.

8. The image analysis method of claim 1, further comprising:

the operation processor determining the at least one first region adjacent to and outside the first reference plane area has a height different from a height of the first reference plane area when a difference between the first planar height of the selected at least one first region and the initial first height is greater than or equal to a predefined threshold.

9. The image analysis method of claim 8, further comprising:

the operation processor deciding whether the plurality of first regions contains other first region having the same height and adjacent position.

10. The image analysis method of claim 1, further comprising:

the operation processor dividing the detection image into the plurality of first regions in a predefined grid arrangement manner to detect the plurality of first heights.

11. A camera apparatus comprising:

an image receiver adapted to capture a detection image via a predefined installation angle; and an operation processor electrically connected to the image receiver in a wire manner or in a wireless manner, and adapted to divide the detection image into a plurality of first regions for acquiring a plurality of first heights of the plurality of first regions relative to the camera apparatus, to define some of the plurality of first regions having the same height and being adjacent to each other as a first reference plane area for acquiring a first plane formula of the first reference plane area, to select at least one of the plurality of first regions adjacent to and outside the first reference plane area and apply the first plane formula for the selected at least one first region to acquire a first planar height of the selected at least one first region, to compare the first planar height with an initial first height of the selected at least one first region, and to determine a landform relation between the first reference plane area and the selected at least one first region relative to the camera apparatus in accordance with a comparison result.

12. The camera apparatus of claim 11, wherein the operation processor is adapted to further divide each first region into a plurality of second regions when a dispersion degree of the plurality of first heights conforms to a predefined condition, to acquire a plurality of second heights of the plurality of second regions relative to the camera apparatus, to define some of the plurality of second regions having the same height and being adjacent to each other as a third reference plane area for acquiring a third plane formula of the third reference plane area, to select at least one of the plurality of second regions adjacent to and outside the third reference plane area and apply the third plane formula for the selected at least one second region to acquire a second planar height of the selected at least one second region, to compare the second planar height with an initial second height of the selected at least one second region, and to determine a landform relation between the third reference plane area and the selected at least one second region relative to the camera apparatus in accordance with a comparison result.

13. The camera apparatus of claim 12, wherein the operation processor is adapted to further utilize the predefined installation angle to compute the plurality of first heights of the plurality of first regions, and to compute standard deviation of the plurality of first heights for acquiring the dispersion degree.

14. The camera apparatus of claim 13, wherein the operation processor is adapted to further utilize the predefined installation angle to compute an average height of all objects inside the detection image, and compares the average height with an object mean height of a place where on the camera apparatus is located for calibrating the plurality of first heights.

15. The camera apparatus of claim 12, wherein the operation processor is adapted to further set the plurality of first heights as a landform height inside the detection image when the dispersion degree of the plurality of first heights does not conform to the predefined condition.

16. The camera apparatus of claim 11, wherein the operation processor is adapted to further utilize a two-dimensional regression algorithm to acquire the first plane formula.

17. The camera apparatus of claim 11, wherein the operation processor is adapted to further determine the at least one first region adjacent to and outside the first reference plane area is on the same plane as the first reference plane area when a difference between the first planar height of the selected at least one first region and the initial first height is lower than a predefined threshold.

18. The camera apparatus of claim 11, wherein the operation processor is adapted to further determine the at least one first region adjacent to and outside the first reference plane area has a height different from a height of the first reference plane area when a difference between the first planar height of the selected at least one first region and the initial first height is greater than or equal to a predefined threshold.

19. The camera apparatus of claim 18, wherein the operation processor is adapted to further decide whether the plurality of first regions contains other first region having the same height and adjacent position.

20. The camera apparatus of claim 18, wherein the operation processor is adapted to further divide the detection image into the plurality of first regions in a predefined grid arrangement manner for detection of the plurality of first heights.

* * * * *